2,883,268

METHOD OF ELECTRIC SMELTING REDUCIBLE MATERIALS

Charles E. Roche, Rahway, and Robert R. Banks, Maplewood, N.J., assignors to Air Reduction Company, Incorporated, New York, N.Y., a corporation of New York No Drawing. Application February 10, 1956
Serial No. 564,650

7 Claims. (Cl. 23—208)

This invention relates to electric smelting of finely-divided materials, such as ores and carbon, and more particularly to the production of calcium carbide in an electric arc furnace from small particles of coke and lime or small admixed pellets.

In current commercial practice, it is customary to charge lumps of coke and lumps of burned limestone into a large electric arc furnace. These lumps are converted into calcium carbide by the arc heat in accordance with the following chemical equation:

$$CaO + 3C \rightarrow CaC_2 + CO$$

In such practice, it is customary to screen out any particles which pass a 10 mesh screen (U.S.), so that these particles are not blown out of the conventional open top furnaces due to the action of the escaping CO. It is also customary (with either a closed or open furnace) to screen out the particles because moving the coke and lime lumps through conveyors, bins, and the like creates fines. These screened-out particles present a significant disposal problem. In order to use these fines, it has been stated that it is necessary to feed the fines to the furnace in a particular manner at the center of three equilaterally-spaced electrodes, so that fusing and blowing problems are avoided. This method is disclosed in British Patent No. 702,303, published January 13, 1954. Similar problems and procedures prevail in many electric smelting operations, such as in the smelting of manganese ores and iron ores.

The objective of the present invention is to accomplish improved electric smelting of finely-divided ore materials and a reducing agent during which smelting a gas is involved.

It is a particular object of the present invention to provide an improved method of making, by electric smelting, a calcium carbide from the screened-out particles above-described or from similar particles when they are available from other sources, such as fines from coking.

The accomplishment of the above objects and other objects, along with the advantages and features of the invention, will be apparent from the following description.

The preferred exemplary embodiment of the present invention involves feeding a mixture of finely-divided and throughly-mixed particles of calcium oxide and carbon or finely-divided particles of mixed lime and carbon (small premixed pellets) to an electric arc furnace so that a substantial bed of charge exists around and under the lower end of the electrodes in the furnace. The arcs are then established. The rate of heat generated and the rate of feed are so adjusted that the carbon monoxide evolved is sufficient to maintain the bed in fluidized condition whereby fusion of the particles does not occur. The size of calcium oxide particles are preferably 4 by 70 mesh (U.S.). All mesh sizes herein are U.S. screens. The size of coke particles are also preferably 4 by 70 mesh. Premixed pellets also preferably are this size. The preferred operating conditions include supply electricity at the rate of about 1800–2000 kw. of electricity per 2000 pound of particles or pellets in each hour. A closed furnace is decidedly preferred and it is preferred that the pressure above the fluidized bed be maintained at slightly above atmospheric (0.2″ of water). However, it is to be understood that with some ores it may be desirable to have a slight vacuum or a somewhat higher super atmospheric pressure. The weight ratios of calcium oxide to carbon are preferably higher than theoretical so that the lime is in excess. However, it is to be understood that theoretical proportions can be used. In this case, 90–95% calcium carbide will be made and, due to the higher melting point, more frequent tapping probably will be required. The closed furnace is greatly preferred, although operation was effected in an open-top furnace, because the turbulence due to the burning of carbon monoxide does not carry out charge from the fluidized bed. With an open furnace, the particle size should be 4 mesh. It is, of course, desirable for the furnace cover to be as close to the top of the furnace charge as feasible, so that the induction losses in the electrode, with conventional arrangement, between the electrical supply contact and the bottom end of the electrode is small. Even with the so-called "submerged electrode shoe" arrangement, the distance between the charge and the roof should be about 3′ for large furnaces in order to provide for the movement of the evolved gas. The effective hearth area and depth in a large furnace should be about 650 square feet and 3–4 feet respectively for three equilaterally-spaced electrodes. It is also preferred that the gas velocity within the fluidized bed with the described particle size be about 3 ft./min. The mixed charge material preferably is fed to the bed at the level which the bed assumes in fluidized condition. Suitable feed ducts can advantageously terminate at that level and be spaced a suitable distance from the electrodes. A furnace apparatus suitable for practicing the present invention is in the Mansfield U.S. Patent No. 1,922,312. The closed furnace having equilaterally-spaced electrodes is preferred, however, in line furnaces or the single electrode furnace shown in the Collin U.S. Patent No. 2,694,097 can be used. Rotation of Collin furnace hearth probably would not be required.

In order to prevent pressure build-up in closed furnaces, it is preferred to aspirate the carbon monoxide from the furnace. If there is an appreciable quantity of minus 70 mesh particles, the velocity of the exhaust gas must be high in order to prevent fall-out of the particles in the exhaust system. This feature is preferred in any event. Hence, small ducts are used. The use of a cyclone dust separator and then a $H_2O$-actuated aspirator and fume-scrubber with stainless steel piping throughout have proved very satisfactory. Advantageously the material separated in the cyclone can be agglomerated or balled-up to form 4 by 70 mesh pellets of carbon and calcium oxide and charged into the furance. At the conditions prevailing (especially at a temperature of 900° F.) it was observed that the residual volatiles are cracked to carbon and that some of the CO was converted to C and $CO_2$ so that the material received from the cyclone contains more carbon than entered the cyclone. Obviously this feature contributes significantly to the over-all economy, especially since the resulting discharge gas containing CO is cooled and more pure in respect to residual volatiles than direct off-take furnace gas and hence better for use in chemical reactions.

In using a small closed furnace having three pairs of inline electrodes and an effective hearth area and depth of 3 square feet and 8 inches respectfully, 50 pounds of lime (4 by 70 mesh) was thoroughly mixed with 30 pounds of petroleum coke fines (4 by 70 mesh) in a conventional mixer. The resulting mixture had a bulk density of about 55–60 pounds per cubic foot. The mixture was charged into hoppers and the feed of mixture was controlled by valves at the rate hereinafter specified after the furnace was started up. The initial charging was such that a bed was formed with its top surface about 6 inches below the top of the cavity in the furnace or expressed differently, the roof thereof. For starting up, the electrodes were conventionally positioned in the cavity and adjacent the idle bottom electrode and the current was turned on, so that arcs passed from one electrode through the idle electrode to an adjacent electrode in accordance with the respective phasing of the three phase current. Once some molten carbide was formed above the idle electrode, the electrodes were automatically positioned slightly above (⅛″) the molten pool by a conventional constant power control device. The rate of feed of charge was then maintained at such a rate that the charge bed was continually agitated by the evolved carbon monoxide and preheated thoroughly by the CO. The appearance of a gently tumbling liquid which the bed takes on is a practical criterion for determining when the heat input (which determines the gas evolved) is proper in relation to the feed rate and furnace size. If the bed boils too violently, rather than rolls or tumbles, or is completely quiescent, there will be, in the first case, too great of an entrainment of fine particles; and, in the second case, there is a danger of fusion of the particles above the pool of carbide with the resulting disadvantages of short circuiting between electrodes and gas channeling with loss of charge. The expressions "being in a fluidized state" or "fluidized bed" mean that condition when the finely-divided particles or pellets are suspended by evolved gases in such a manner that the particles and gases assume essentially the characteristics of a liquid as opposed to particles entrained in a gas or a solid-like bed of particles through which a gas permeates.

In retrospect, it was quite unexpected that such trouble-free operation and efficiency are achieved when the factors involved are considered. It is to be realized that, in the reaction zone at the surface of the pool of carbide and the tips of the electrodes, there are 3600 electric-fluid movements per minute and huge volumes of evolved gas which might disturb the charge by explosions or channeling. It is believed that a gas pocket exists above the liquid carbide which serves to uniformly distribute the gas to the bed.

The highly preferred operating conditions are 40 kw. per square foot of effective hearth area and 1 pound of charge material per hour for each kw. The term effective hearth area, means substantially all of the furnace cavity area. The effective hearth depths herein mentioned are relatively immaterial under the conditions encountered, such as the volume of evolved gas.

The calcium oxide materials which were used were lime screenings and calcined acetylene by-product. The carbon materials which were used were coke fines from metallurgical coke, petroleum coke fines, and coal char fines. These materials and others suitable for the calcium carbide production are described in Kirk-Othmer's Encyclopedia of Chemical Technology (1948). See pp. 837–838 of volume II.

With the present invention wherein the unreacted charge material is fluidized by the gas escaping from the reaction zone and the charge material descends gradually into the furnace, the advantages of high charge reactivity, low electrode consumption, and utilization of fines are achieved. The high charge reactivity is due to the high ratio of area to mass of the extremely fine charge. In the practice of the present invention, dust losses are small, furnace operation is very smooth with electrodes remaining well down in the bed and the level of the charge was quite high. The kilowatt hours required per cubic foot of acetylene from produced carbide is very low (0.35). The gas generated by the reaction ascends through the bed in a uniform manner and keeps the bed quite uniform in texture and, due to the tumbling action, uniformly preheats the descending charge. Very little crucible forms in the upper part of the furnace. The term crucible as used herein refers to the secondary furnace lining which is formed from the charge material and calcium carbide. Crucible formation above the reaction zone is undesirable because it interferes with proper feeding of charge material. Clinker formation on the electrode is reduced to a minimum and, in any event, does not interfere with the descending movement of the fluidized charge. Tapping is easily accomplished without difficulty. Of course, it is necessary to prevent the exit of the fluidized bed and the gases and this is easily achieved by establishing a routine tapping schedule. It is also to be appreciated that another disadvantage of the prior practices is overcome by the present invention. This disadvantage has to do with the availability of sources of carbon. In prior practice, a highly resistive carbon was necessary so that the electrodes penetrate the charge. Previously only certain carbon sources could be used because many carbon sources tend to conduct better as they descend in the furnace. This causes the electrodes to ascend and decreases efficiency. No reaction of particles which are in the fluidized state occurs because of the gas surrounding the particles and because of the slow rate of reaction between solid CaO and C.

While described in detail in relation to calcium carbide, it is to be understood that the fluidized bed technique adjacent an arc zone can be used with ore particles of manganese, iron, silica, ilmenite, rutile, phosphate alumina clays, chrome, zirconium, lithium, strontium, barium, lanthanum and the rare earths with carbon particles being used as the reducing agent, provided the aforementioned mesh size (4 x 70) and the evolved reaction gas velocity are maintained. Of course mixed pellets of the same size can be used. Thus, it is to be realized that a novel improved method for smelting reducible compounds by means of an electric-arc-type furnace having a vertically-arranged cavity for fresh charge has been invented. The finely-divided ores and solid carbon reducing agent or small pellets made from the two items are fluidized and preheated by the evolved gas or gases by adjusting the heat and charge feed rate and the molten end product (iron, for example) is tapped in the manner described in relation to calcium carbide.

It is of course apparent that various changes and modifications can be made in the disclosed method without departing from the invention as defined by the following claims.

We claim:

1. The method of continuously making calcium carbide in an electric arc-type furnace comprising, forming a bed of intimately mixed finely divided particles of calcium oxide and carbon in said furnace, said particles being substantially between 4 and 70 mesh, establishing an electric arc zone in a lower portion of said bed of particles, continuously feeding said particles to the bed above said arc zone, correlating the heat of said electric arc and the rate of said feeding so that the gases evolved in converting said calcium oxide and said carbon into calcium carbide are sufficient to maintain substantially the entire portion of the bed above said arc zone in a fluidized state, and withdrawing the calcium carbide product at a location below said bed of particles.

2. The method in accordance with claim 1, wherein said furnace is a closed furnace, the gases evolved have a velocity of about 3 feet per minute, and super-atmospheric pressure is maintained within said furnace.

3. The method in accordance with claim 1 wherein electricity is supplied to said furnace at about 40 kilowatts per square foot of hearth area and at about 1800 to 2000 kilowatts per 2000 pounds of particles fed in each hour.

4. The method in accordance with claim 1 wherein said furnace has equilaterally spaced electrodes, and said particles comprise small pellets being between 4 and 70 mesh.

5. The method in accordance with claim 1 wherein said evolved gases at about 900° F. are aspirated from said furnace through a cyclone separator by a water-actuated aspirator and fume scrubber to obtain dust containing carbon and calcium oxide and cooled exhaust gas containing carbon monoxide, forming said dust into small agglomerates about 4 mesh in size, feeding said agglomerates to said furnace, and recovering said exhaust gas.

6. The method of continuously reacting a solid reducible compound and a solid reducing agent in an electric arc-type furnace to form a molten product and a gas comprising forming a bed of intimately mixed finely divided particles of said compound and finely divided particles of said reducing agent, said particles being substantially between 4 and 70 mesh, establishing an electric arc zone in a lower portion of said bed of particles and reducing said compound with said agent in the heat of said arc zone whereby a gas is evolved, continuously feeding said particles to the bed above said arc zone, correlating the heat of said arc zone and the rate of said feeding so that the gases evolved are sufficient to maintain substantially the entire portion of the bed above said arc in a fluidized state, and withdrawing the resulting molten product at a location below said arc zone.

7. The method in accordance with claim 6 wherein said reducing agent is carbon, and the evolved gases have a velocity of about three feet per minute.

References Cited in the file of this patent

UNITED STATES PATENTS

| | | |
|---|---|---|
| 601,366 | Wilson et al. | Mar. 29, 1898 |
| 675,646 | Zimmerman et al. | June 4, 1901 |
| 750,096 | Cowles | Jan. 19, 1904 |
| 750,170 | Cowles | Jan. 19, 1904 |
| 1,857,799 | Winkler | May 10, 1932 |
| 2,765,261 | Drews | Oct. 2, 1956 |